April 21, 1942.    R. G. AREY    2,280,613
RECORDER
Original Filed April 7, 1938
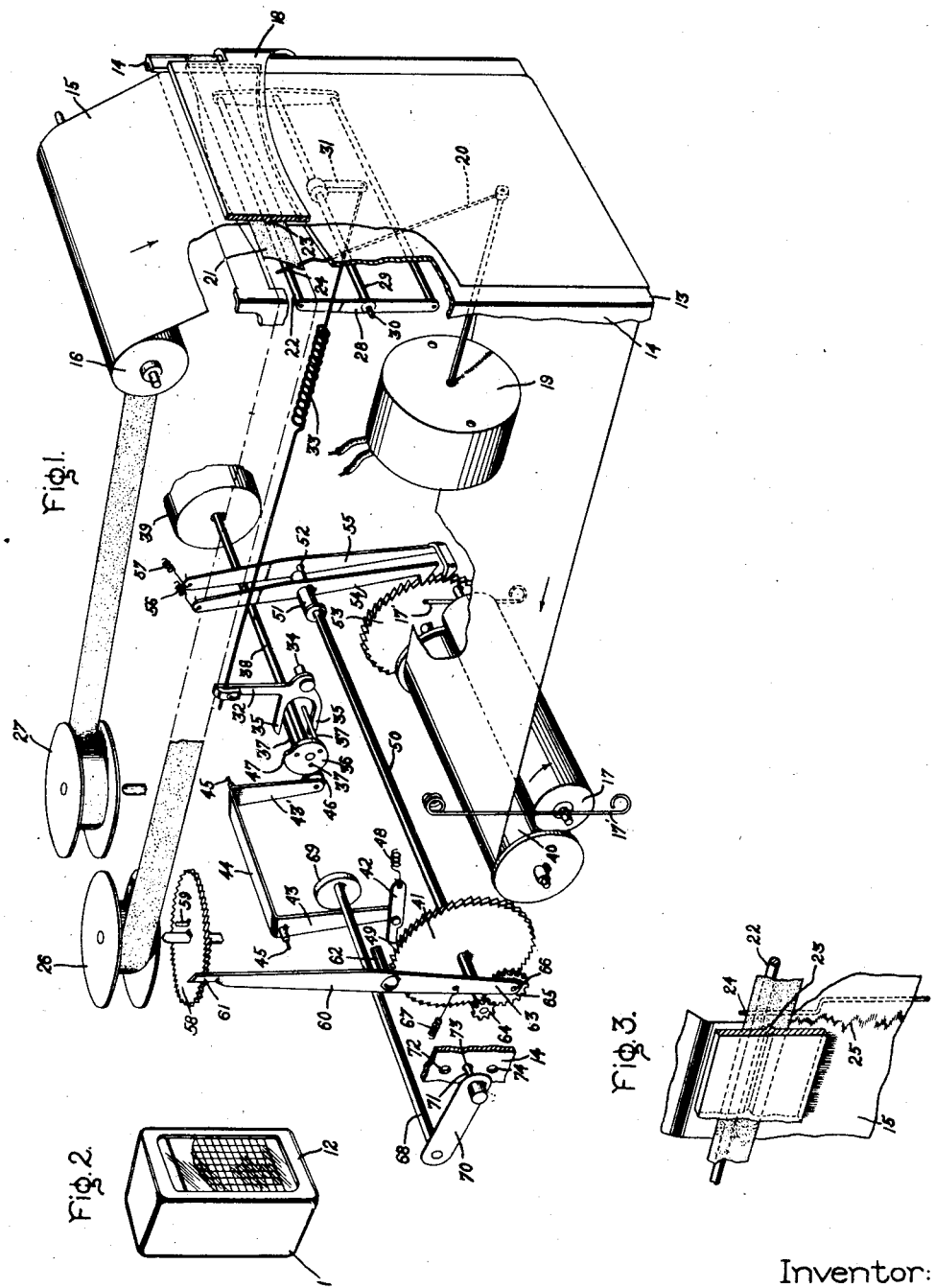
Inventor:
Ralph G. Arey,
by Harry C. Dunham
His Attorney Patented Apr. 21, 1942

2,280,613

UNITED STATES PATENT OFFICE

2,280,613

RECORDER

Ralph G. Arey, Swampscott, Mass., assignor to General Electric Company, a corporation of New York Original application April 7, 1938, Serial No. 200,707. Divided and this application May 11, 1939, Serial No. 273,085

3 Claims. (Cl. 234—68)

This application is a division of my copending application, Serial No. 200,707, filed April 7, 1938.

My invention relates to recorders and curve drawing instruments and concerns particularly so-called inkless recorders or recorders of the type in which the need for a movable pen and ink is eliminated.

It is an object of my invention to provide a recorder with a simple construction and method of operation having the operating and indicating elements mounted as a single unit behind a chart on a single one piece frame.

It is a further object of my invention to provide a recorder producing a clear record with the markings on the top surface of the chart and employing a standard record chart of paper or other suitable material, which need not be transparent.

It is still another object of my invention to provide a recorder which may produce a curve following variations of the recorded quantity with great rapidity and reproducing with high fidelity even sharp fluctuations in the magnitude of the recorded quantity.

It is also an object of my invention to provide a recorder in which the supply roll is clearly visible so that it may readily be ascertained when the chart needs to be replaced and in which both the re-roll and the supply roll are accessible to permit convenient adjustment or renewal of the record chart.

It is another object of my invention to provide a recorder construction in which a large amount of the chart is visible so that a record curve for a considerable period of time may be observed without pulling out the re-roll.

Still another object of my invention is to produce a recorder in which the recording operations consume a very small amount of energy and in which a single low-power motor may be utilized to drive all elements of the apparatus although considerable force is produced for making the impressions on the record chart.

Still another object is to provide an intermittent marking recorder avoiding stickiness in the deflection of the movable element of the instrument and avoiding sticking of the instrument pointer to the marking material or to the pointer striker bar.

Still another object is to provide a recorder with a marking arrangement which will operate efficiently with a relatively low-torque instrument and permit considerable reduction of the size and weight of the entire recorder.

Still another object of my invention is to provide a recorder of the type having a movable marking ribbon in which there is a proper and constant relationship between the speeds of the chart and the marking ribbon, and the chart record will be completed before the ribbon runs out.

Still another object of my invention is to provide a curve-drawing instrument for measuring a variable quantity which not only records the measured values of the quantity but also records the time of duration of surges in the case of variations taking place with great rapidity in comparison with the speed of travel of the record chart. Likewise it is an object of my invention to provide a recording instrument combining the advantage of a continuous line recorder for normal conditions and of a dotted line recorder for surges.

Other and further objects and advantages will become apparent as the description proceeds.

My invention may be understood more readily from the following detailed description when considered in connection with the accompanying drawing and those features of the invention which are believed to be novel and patentable will be pointed out in the claims appended hereto.

In carrying out my invention in its preferred form I provide a movable strip chart, a platen behind which the chart is moved and a measuring instrument with a pointer movable behind the chart. There is a ribbon impregnated with marking material stretched across the chart between it and the platen and a vibrating striker is mounted behind the pointer so as to drive the pointer intermittently against the chart and in this way press the portion of the chart in front of the pointer against the marking ribbon, thus producing suitable markings to form a record curve on the chart. A single motor is utilized for reciprocating the striker and for advancing both the chart and the marking ribbon. A pawl and ratchet mechanism is provided for advancing the strip chart and the speed of the chart is made adjustable by providing an arrangement for adjusting the throw of the chart advancing pawl.

In the drawing Fig. 1 is a perspective view of the mechanism employed in one embodiment of my invention with the depth greatly exaggerated for the sake of separating the parts and showing them with greater clarity. Fig. 2 is a perspective diagram of the apparatus of Fig. 1 mounted in its casing and shown in natural proportions. Fig. 3 is a perspective fragmentary view of a portion of the apparatus of Fig. 1 showing more in detail the relationship between the instrument pointer in the chart and the arrangement for producing markings on the chart. Like reference characters are utilized throughout the drawing to designated like parts.

In the arrangement illustrated in Figs. 1 and 2 there is a chart carriage secured in a casing 11, which may be either a portable casing or one designed for mounting on a switchboard. It will be understood that the casing 11 may be provided with a cover 12 which may be opened for any necessary adjustments of the mechanism or replacement of the chart and marking material, but the construction is such that the chart carriage need not be moved for this purpose. The chart carriage comprises a sheet of metal bent to form a front plate 13 and side plates 14, the greater part of the side plates being broken away for the sake of clarity in the drawing. The side plates provide support for the mechanism of the apparatus including the various bearings which are not shown.

A movable strip chart 15 is provided which is designed to pass downward in front of the front plate 13 from a supply roll 16 to a re-roll 17. The front surface of the plate 13 defines a plane in which the chart travels. Secured to the side plates 14 and extending across the upper front plate 13 in front of the strip chart 15 is mounted a platen 18. A suitable indicator or measuring instrument such as a current responsive measuring instrument 19 is provided having a movable arm or pointer 20 designed to deflect in a plane behind the strip chart 15 and parallel to the front plate 13. A sheet or a strip 21 impregnated or coated with a suitable marking material such as a strip of carbon paper or a typewriter ribbon, for example, is mounted between the strip chart 15 and the platen 18, and a striker 22 consisting of a pivotally mounted bar parallel to the surface of the front plate 13 and extending along the marking strip 21 is mounted behind the instrument pointer 20. Suitable means are provided for vibrating or reciprocating the striker bar 22 toward and away from the front plate 13 so as to drive the instrument pointer 20 intermittently against the strip chart 15 and in this manner cause the portion of the strip chart in front of the instrument pointer 20 to press against the marking strip 21 and produce markings on the front of the strip chart.

The platen 18 may be formed with a straight edge 23 on its back surface and the end 24 of the instrument pointer 20 may be substantially straight and parallel to the plane of the strip chart so that, when the instrument pointer 20 is struck by the striker bar 22, there will be a pressure point at the intersection of the instrument pointer 24 and the straight edge 23 at which the marking ribbon 21 and the strip chart 15 will be pressed together. This action produces a mark on the strip chart. In the arrangement shown the straight edge 23 forms the apex of a ridge of triangular cross-section and the pointer end 24 is of circular cross section, but it will be understood that both might be of circular or triangular cross-section or any other suitable shape for the purpose of producing on the strip chart 15 a well-defined point of the curve 25 on the strip chart 15 whenever the bar 22 strikes the instrument pointer 24. Preferably, the bar 22 is substantially behind the straight edge 23. It will be apparent that with the arrangement shown, any mark produced on the strip chart 15 for a given position thereof, regardless of the angular position of the instrument pointer 20, will be on a straight line across the strip chart 15 instead of on an arc as will be the case if a flat platen were employed and the end of the instrument pointer 20 were bent to form a stylus striking the back surface of the strip chart 15. However, my invention, in general, is not limited to the precise arrangement shown.

I consider it important to mount the marking strip 21 in front of the strip chart and the movable pointer 20 in back of the strip chart in order that the record will be produced on the front of the strip chart, making it unnecessary to employ a transparent strip to have the record visible from the front of the instrument while the record is being produced, and also preventing the movable pointer from coming in direct contact with the marking material thus avoiding the possibility of the pointer sticking to the marking strip or to the striker bar 22. In this way what is known as stickiness or sluggishness of the action of the instrument 19 is overcome and the angular deflection of its pointer 20 responds promptly and continuously to variations in the magnitude of the quantity measured by the instrument 19. There is no mechanism which deflects in front of the chart plane or outside of the casing volume defined by the chart plane. The instrument striker bar and operating mechanism as well as the deflecting pointer 20 are mounted inside the plates 13 and 14 and behind the chart 15, for the sake of compactness, for the sake of completely hiding and protecting the instrument and operating mechanism, in order to avoid covering the chart or preventing it from being observed throughout the length of the front plate 13, and in order to permit conveniently and safely pulling chart off the re-roll 17 when it is desired to examine a greater length of back record.

Preferably, to avoid wearing out the marking strip 21, it is made in the form of a long movable strip wound upon spools 26 and 27 in a manner somewhat similar to the mounting of typewriter ribbon on typewriters, and a suitable arrangement is provided for unwinding the ribbon from one spool and rewinding it on the other. In the illustration shown, a spool 26 serves as a re-roll and is driven at a speed proportional to the speed of the strip chart 15 in a manner which will be explained hereinafter.

I consider it important to provide the striker bar 22 with an actuating mechanism whereby the bar 22 will strike the pointer end 24 with considerable force so as to produce clear records but without the consumption of more than a very small amount of power in order that the same motor may be used for actuating the striker bar 22 and advancing the strip chart 15 and the marking ribbon 21.

The striker bar 22 forms one side of a rectangular striker frame 28 which has a central rod 29 extending substantially through the center of gravity of the frame 28. Pivots 30, only one of which is visible, are provided at the ends of the rod 29 and there are suitable bearings, not shown, cooperating with the pivots 30 to permit the frame 28 to be freely balanced about the pivots 30. In order that means for vibrating or oscillating the striker frame 28 may be attached thereto an arm or crank 31 may be secured to the central rod 29 of the striker frame 28.

For oscillating the striker frame 28 a power driven rocker or oscillating arm 32 is provided which is connected to the arm 31 by a suitable resilient member such as a spring 33. The relationship between the stiffness of the spring 33 and the moment of inertia of the striker frame 28 is so chosen that the natural frequency of vibration of the vibratory system formed by the frame 28 and the spring 33 is the frequency at which it is desired to have the striker bar 22 strike the pointer end 24. That is, the natural frequency of the striker frame 28 is equal to the frequency with which dots or marks are to be placed upon the moving strip chart 15. The frequency selected is sufficiently high so that a substantially continuous record is produced following even sharp and rapid fluctuations in magnitude of the quantity measured by the instrument 19. The rocker 32 is, of course, oscillated at the same frequency so that a very small amplitude of vibration of the striker arm 22 and furthermore, the striker arm 22 will strike with considerable force although relatively little energy is supplied by the rocker 32.

In the apparatus described by way of illustration, the rocker 32 is driven at three strokes per second. In order that the rocker 32 may be oscillated by a revolving motor, a cam arrangement is provided. The rocker 32, which is pivoted at 34, is provided with a fork 35 having tines extending radially from the pivot 34 to form cam followers. A three-lift cam is formed by a disk 36 into which three pins 37 are inserted axially with the pins placed between the tines of the fork 35. The disk 36 is mounted upon a shaft 38 of a one-revolution-per-second motor 39. The spacing between the pins 37 is made such that rotation of the disk 36 carrying the pins 37 produces oscillation of the fork 35 thereby rocking the rocker arm 32. Owing to the small amount of power required for operating the striker bar 22 in the arrangement which I have described, the motor may be a relatively small motor having a small power consumption such as motors utilized in synchronous clocks and described in Patent No. 1,495,936—Henry Warren, for example.

For the purpose of causing the strip chart 15 to advance at uniform speed without need for additional driving power I provide a ratchet chart advancing means powered from the same motor 39 which drives the chart marking mechanism. The chart 15 is rewound on the roll 17 referred to as a re-roll which is pressed by springs 17' against a driving drum 40 and, therefore, frictionally engages the driving drum 40, driven from the shaft 38 of the motor 39 through a two-stage pawl and ratchet driving mechanism. The first stage of the pawl and ratchet driving mechanism consists of a ratchet wheel 41 cooperating with a movable pawl 42 carried at the end of one arm 43 of a U-shaped cradle 44 pivoted in pivots 45 cooperating with bearings, not shown. The remaining arm 43' of the cradle 44 carries at its end a cam follower 46, and the circumferential surface of the disk 36 on the shaft 38 of the motor 39 is cut to form a cam surface 47 cooperating with the cam follower 46. Suitable means such as a spring 48 attached to the pawl 42 are provided for biasing the cam follower 46 against the cam surface 47 and for resiliently holding the point 49 of the pawl 42 against the teeth of the ratchet 41. The ratchet 41 is carried by shaft 50 journaled in suitable bearings, not shown. At one end the shaft 50 carries crank pins 51 and 52 or eccentrics which have axes parallel to the axis of the shaft 50 but eccentric thereto. The pin 51 is of relatively large diameter and the pin 52 is formed as an extension of the pin 51 but is eccentric with respect to the pin 51. The second stage of the pawl and ratchet advancing mechanism for the strip chart consists of a ratchet 53 secured to the chart driving drum 40 and a pair of pawls 54 and 55 cooperating with the ratchet 53 and pivotally mounted upon the pins 51 and 52 respectively. For resiliently holding the pawls 54 and 55 against the teeth of the ratchet 53 suitable means such as springs 56 and 57 are provided.

When the apparatus is in operation the rotation of the shaft 38 and the cam surface 47 will produce reciprocating motion of the cam follower 46, as well as the pawl 42, both of which are carried by the oscillating cradle 44 so that on each rearward stroke of the pawl 42 the ratchet 41 is rotated. Rotation of the shaft 50 secured to the ratchet 41 will, in turn, produce eccentric rotation of the pins 51 and 52 thereby causing the pawls 54 and 55 to advance alternatively and producing continuous rotation of the ratchet 53. Since one or the other of the pawls 54 and 55 is always in mesh with the ratchet 53 backlash, or backward rotation of the driving drum 40 cannot take place.

For the purpose of causing the marking ribbon 21 to advance at a speed proportional to the speed of the strip chart 15, another pawl and ratchet advancing mechanism is provided which is driven from the shaft 50. The mechanism for advancing the ribbon 21 consists of a ratchet 58 removably connected to the ribbon re-roll spool 26 by a pin 59 cooperating with an aperture, not shown, in the spool 26 in a manner well-known in the typewriter art. For driving the ratchet 58 there is an oscillating arm 60 having a pawl 61 formed in one end thereof, having a supporting pivot in the form of a screw 62 secured to a portion of the chart carriage, not shown, and having means at the end 63 opposite from the pawl 61 for oscillating the arm 60. The oscillating means consists of a pinion 64 mounted on the rotating shaft 50 and meshing with a gear 65 having an eccentric hub whereby the gear 65 is eccentrically mounted upon a pivot 66 formed at the end 63 of the arm 60. For resiliently biasing the end 63 toward the pinion 64 and holding the pinion 64 and the gear 65 in mesh, suitable means such as a spring 67 are provided.

As the shaft 50 rotates the pinion 64 will rotate and produce rotation of the gear 65 in mesh therewith. However, since the gear 65 is eccentric on its supporting pivot 66 and the spring 67 holds the pinion 64 and gear 65 in mesh, the rotation of the gear 65 will result in reciprocating motion of its pivot 66 thereby oscillating the arm 60 and causing rotation of the ratchet 58 and the ribbon re-roll spool 26.

To permit adjusting the speed of travel of the strip chart 15, I may provide means for varying the throw of the pawl 42 which cooperates with one of the chart advancing ratchets 41. Such means may consist of rod 68 adjustable in its angular position carrying an eccentric disk 69, the circumference of which serves as a backstop for the arm 43 carrying the chart advancing pawl 42. To permit adjusting the angular position of the rod 68, a resilient arm 70 may be secured thereto having a pin 71 secured at the end thereof adapted to cooperate with any of several openings 72, 73, or 74 in one of the side plates 14 of the chart carriage, only a portion of which is shown in the drawing. By pulling the pin 71 out of one of the apertures 72, 73 or 74 and inserting it in another, the angular position of the eccentric disk 69 may be changed and thus the position of rest of the arm 43 and the pawl 42 may be changed so as to vary the throw of the chart advancing pawl 42 and thus vary the distance advanced for each revolution of the motor shaft 38. The minimum advance of ratchet wheel 41 may be one tooth and the maximum advance three or more teeth. It will be observed, however, that adjustment of the eccentric cam for the purpose of varying chart speed does not vary the speed of the rocker arm 32 and for this reason even the adjustment for very slow chart speed does not interfere with the maintenance of the high speed of operation of the striker bar 32 so that faithful records of rapid variations in the measured quantities may be made with any adjustment of the apparatus. The insertion of the pin 71 in the apertures 72, 73 and 74 provides for chart speeds of one, two and three inches per hour, respectively, the most generally provided chart speeds, as will be understood by those skilled in the art. The three-inch per hour speed may be used when the recorder is to be serviced and the record roll is to be replaced weekly, however, one inch per hour is the most common chart speed as this permits monthly servicing.

With such slow chart speeds in conjunction with continuous record curves it will be apparent that the length of duration of surges could not be read from the chart for the reason that the width of an ink or pencil line is of the same or greater order of magnitude than the chart distance corresponding to the duration of a surge. For example, with the customary chart speed of one inch per hour, a distance along the time axis of .050 inch, about the closest that can conveniently be measured on a continuous line chart without special instruments, would correspond to a time period of one hundred eighty seconds or three minutes. In my apparatus producing three dots per second, however, measurements in surge records of time periods as short as one second can readily be made because when the measured quantity rises or falls very rapidly the record curve is drawn out sidewise so as to separate the dots laterally. By counting the dots, the duration of the entire surge and the duration of portions of the surge may readily be ascertained because each dot represents a fixed time interval, in this case one-third second irrespective of the chart speed. Thus there are coarse and fine measurements of time duration, small scale for values read under steady state conditions and large scale for surge conditions. With the ordinary chart speed of one inch per hour and providing three strokes per second of the striker 22, my apparatus provides one stroke of the striker or one dot for each ten thousandth inch of chart travel or more exactly, 10,800 dots per inch of travel. Thus the dots actually overlap in the longitudinal direction when the measured quantity remains constant or varies gradually. But in the case of surges, the pointer moves so rapidly that the dots are spread out laterally and may readily be distinguished and counted. I consider the most useful speed of dotting to fall between one and ten dots per second so that with chart speeds from one to three inches per hour the most useful ratios of chart speeds in inches to dotting speeds in dots per second fall between 1:1200 and 1:36,000, preferably between 1:3600 and 1:36,000.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States is:

1. In a chart recorder of the intermittent marking type having a marking strip and freely movable arm, a movable striker for producing contact between portions of the marking strip and a chart adjacent said movable arm, a power driven reciprocating rocker for oscillating said striker and a resilient connection between said rocker and said striker, the frequency of operation of said rocker and the stiffness of said resilient means and moment of inertia of said striker being so selected that natural frequency of vibration of said striker substantially equals the frequency of reciprocation of said rocker.

2. In a recorder having a casing with an exposed substantially flat front face and a strip chart movable vertically along said exposed front face of the casing, the combination of, a platen in front of said strip chart, extending across the chart along its surface, a marker strip between said platen and said chart extending along the platen, an arm behind said chart movable in response to variations in indications to be recorded, said arm being transversely movable in a plane parallel to the surface of said chart and along said platen, and a striker behind said arm for driving said arm and a portion of said chart against said marker strip and said platen, whereby no mechanism which deflects is required in front of the chart plane, said arm is in a protected location and the chart may be examined or pulled back without interference.

3. In a recorder having a casing with an exposed substantially flat face and a strip chart, movable along said exposed face of the casing in a plane, which plane forms one of the boundaries of the volume enclosed by the casing, the combination of a platen in front of said chart, extending across the chart along its surface, a marking element between the platen and the chart in cooperative relation with the platen, an arm behind said chart movable in response to variations in indications to be recorded, said arm being transversely movable in a plane parallel to the surface of said chart and to said platen, and a striker behind said arm for driving said arm and a portion of said chart against said marking element, whereby no mechanism which deflects is required outside the boundary of the casing volume formed by the chart plane, said arm is in a protected location and the chart may be examined or pulled back without interference.

RALPH G. AREY.